(12) United States Patent
Chew et al.

(10) Patent No.: US 9,075,128 B2
(45) Date of Patent: Jul. 7, 2015

(54) GRATING LOBE MITIGATION IN PRESENCE OF SIMULTANEOUS RECEIVE BEAMS

(75) Inventors: Daniel S. Chew, Danville, CA (US); Leo H. Hui, Alhambra, CA (US)

(73) Assignee: RAYTHEON COMPANY, Waltham, MA (US)

( * ) Notice: Subject to any disclaimer, the term of this patent is extended or adjusted under 35 U.S.C. 154(b) by 590 days.

(21) Appl. No.: 13/345,915

(22) Filed: Jan. 9, 2012

(65) Prior Publication Data

US 2013/0176173 A1 Jul. 11, 2013

(51) Int. Cl.
 H01Q 3/00 (2006.01)
 G01S 7/28 (2006.01)
 G01S 7/36 (2006.01)
 H01Q 3/26 (2006.01)
 G01S 7/292 (2006.01)

(52) U.S. Cl.
 CPC ............ G01S 7/2813 (2013.01); *H01Q 3/2635* (2013.01); *G01S 7/2925* (2013.01); *H01Q 3/26* (2013.01); *G01S 7/292* (2013.01); G01S 7/36 (2013.01); H01Q 3/2629 (2013.01)

(58) Field of Classification Search
 CPC ........ G01S 7/2813; G01S 7/36; H01Q 3/2629
 USPC ........................ 342/377–379, 372, 380–383
 See application file for complete search history.

(56) References Cited

U.S. PATENT DOCUMENTS

| 4,179,683 | A | | 12/1979 | Hildebrand et al. | |
|---|---|---|---|---|---|
| 4,959,653 | A | * | 9/1990 | Ganz ............................... | 342/17 |
| 5,450,089 | A | | 9/1995 | Hui et al. | |
| 5,455,591 | A | | 10/1995 | Hui | |
| 5,640,165 | A | | 6/1997 | Hui et al. | |
| 5,986,605 | A | * | 11/1999 | Priebe et al. ................... | 342/427 |
| 6,538,597 | B1 | | 3/2003 | Steudel | |
| 6,661,375 | B2 | * | 12/2003 | Rickett et al. ................. | 342/372 |

(Continued)

FOREIGN PATENT DOCUMENTS

DE 10036132 A1 2/2002

OTHER PUBLICATIONS

Ulrich Nickel; Design of generalised 2D adaptive sidelobe blanking detector using the detection margin, Elsevier, 2009.*

(Continued)

*Primary Examiner* — Frank J McGue
(74) *Attorney, Agent, or Firm* — Burns & Levinson LLP; Joseph M. Maraia (57) ABSTRACT

A method that digitally distinguishes mainlobe detections from grating lobe and sidelobe detections without need for added antenna or receiver architecture. The method includes applying receive weights to return radar data for each radar receive element to steer each subarray of a array radar antenna to a direction other than the subarray transmit angle and includes applying a subarray weight to each subarray to generate the array radar antenna receive beam data having magnitude and phase components. The method includes applying predetermined scale factors to the subarray beam data magnitude for each subarray to generate scaled subarray beam data magnitudes. The method includes generating guard beam data for each subarray based on the scaled subarray beam data magnitudes. The method also includes determining if the return radar data corresponds to a mainlobe or a grating lobe or sidelobe based on the receive beam data and the guard beam data.

8 Claims, 5 Drawing Sheets

(56) References Cited

U.S. PATENT DOCUMENTS

| | | |
|---|---|---|
| 6,750,809 B1 | 6/2004 | Cho et al. |
| 6,965,341 B1 | 11/2005 | Cho et al. |
| 7,006,031 B1 | 2/2006 | Abatzoglou et al. |
| 7,081,851 B1 | 7/2006 | Lewis |
| 7,145,496 B2 | 12/2006 | Cho et al. |
| 7,145,498 B2 | 12/2006 | Cho et al. |
| 7,265,713 B2 | 9/2007 | Lewis |
| 7,277,042 B1 | 10/2007 | Cho et al. |
| 7,301,495 B2 | 11/2007 | Abatzoglou et al. |
| 7,532,150 B1 | 5/2009 | Abatzoglou et al. |
| 7,936,304 B2 | 5/2011 | Barnard et al. |
| 7,972,271 B2 | 7/2011 | Johnson et al. |
| 2009/0102717 A1 | 4/2009 | Lok et al. |

OTHER PUBLICATIONS

Wenchong Xie, STAP for airborne radar with cylindrical phased array antennas, Elsevier, 2009.*

Nickel, U., "Detection with Adaptive Arrays with Irregular Digital Subarrays", Radar Conference, 2007 IEEE, IEEE, PI, Apr. 1, 2007, pp. 635-640, XP031180981.

* cited by examiner

GRATING LOBE MITIGATION IN PRESENCE OF SIMULTANEOUS RECEIVE BEAMS

GOVERNMENT SUPPORT

The invention was supported, in whole or in part, by Grant No. HR0011-09-C-0036 from the Department of Defense. The Government has certain rights in the invention.

FIELD OF THE INVENTION

The currently described invention relates to methods and apparatus for digitally distinguishing mainlobe detections from grating lobe and sidelobe detections.

BACKGROUND

A common technique to improve search mode performance in radar signal processing involves the generation of simultaneous receive beams. The technique enables an operator to scan a wide area in a short amount of time. The generation of simultaneous receive beams is typically done using an antenna consisting of multiple subarrays. Since subarray spacings are typically large compared to the half-wavelength, grating lobes arise whenever a receive beam is pointed off angle from the transmit beam direction. These grating lobes are often close to the antenna mainlobe and much larger than the antenna sidelobes. Many techniques have been used in the past to architect the antenna to reduce the size of the grating lobes or minimize its impact on the radar returns. As successful as these techniques may be, residual grating lobes and sidelobes remain and target returns from these regions can register as false hits coming from the mainlobe if not eliminated. A need therefore exists for improved methods and systems for distinguishing mainlobe detections from grating lobe and sidelobe detections.

Methods and systems to distinguish mainlobe detections from grating lobe and sidelobe detections have existed, but typically they involve added antenna and receiver architecture, such as the use of guard horns or frequency diversity. A technique that does not require added antenna and receiver architecture used post-processing digital filtering and correlations.

SUMMARY

The current embodiments describe a new way to distinguish mainlobe detections from grating lobe or sidelobe detections by using the receive beam and subarray beam patterns. One embodiment is a method for digitally distinguishing mainlobe detections from grating lobe and sidelobe detections. The method includes applying receive weights to return radar data for each radar receive element to steer each subarray of an array radar antenna to a direction other than the subarray transmit angle. The method also includes applying a subarray weight to each subarray to generate the array radar antenna receive beam data having magnitude and phase components. The method also includes applying predetermined scale factors to the subarray beam data magnitude for each subarray to generate scaled subarray beam data magnitudes. The method also includes generating guard beam data for each subarray based on the scaled subarray beam data magnitudes. The method also includes determining if the return radar data corresponds to a mainlobe or a grating lobe or sidelobe based on the receive beam data and the guard beam data.

In some embodiments, the array radar antenna is a linear array or a cylindrical array. In some embodiments, the array radar antenna is a cylindrical array and applying the receive weight spoils the subarray beam to broaden the subarray beam and steer the subarray beam.

In some embodiments, generating guard beam data for each subarray includes selecting a maximum value of the scaled subarray data magnitudes. In some embodiments, the maximum value of the scaled subarray data magnitudes is determined in accordance with:

$$BG(BeamNum) = \max_i [SF_i(BeamNum) \times |SA_i|],$$

where
$SA_i$ is the ith subarray beam data, $SF_i(BeamNum)$ is the ith subarray scale factor for receive beam BeamNum, and $BG(BeamNum)$ is the guard beam data for receive beam BeamNum.

In some embodiments, the return radar data corresponds to a mainlobe if:

$$|BM(BeamNum)| > BG(BeamNum),$$

where
$|BM(BeamNum)|$ is the magnitude of the return radar data for beam number BeamNum.

In some embodiments, the return radar data corresponds to a grating lobe or sidelobe if:

$$|BM(BeamNum)| \leq BG(BeamNum).$$

In some embodiments, the method includes determining the scale factors for the receive beams in accordance with:

$$SF_i(BeamNum) = \frac{K|RBP(BeamNum)|_{MAX}}{|SAP_i @ Ang|},$$

where
$|RBP(BeamNum)|_{MAX}$ is maximum magnitude for receive beam pattern for beam number BeamNum, $SF_i(BeamNum)$ is the scale factor for ith subarray for the receive beam BeamNum, $SAP_i$ is the ith subarray beam pattern data, and Ang is the receive angle of a subarray, K is a beamwidth factor.

In some embodiments, Ang is determined in accordance with:

$$Ang = \left\{ \begin{array}{c} Ang_L \\ Ang_R \end{array} \right\},$$

where
$Ang_L$ is selected if boresight of $SAP_i$ is pointed left of receive beam BeamNum, and $Ang_R$ otherwise.

In some embodiments, the method includes determining location of a target with an array radar antenna system based on the return radar data that corresponds to the mainlobe.

Another embodiment is a system for digitally distinguishing mainlobe detections from grating lobe and sidelobe detections. The system includes a plurality of subarrays in an array radar antenna system, each subarray including a plurality of receive elements. The system also includes a beam forming module including a processor configured to apply receive weights to radar return data for each radar receive element to steer each subarray to a direction other than the subarray transmit angle. The processor is also configured to apply a subarray weight to each subarray to generate the array radar antenna receive beam data having magnitude and phase components. The processor is also configured to apply predetermined scale factors to the subarray beam data magnitude for each subarray to generate scaled subarray beam data magnitudes. The processor is also configured to generate guard beam data for each subarray based on the scaled subarray beam data magnitudes. The processor is also configured to determine if the return radar data corresponds to a mainlobe or a grating lobe or sidelobe based on the receive beam data and the guard beam data.

In some embodiments, the array radar antenna is a linear array or a cylindrical array. In some embodiments, the array radar antenna is a cylindrical array and the processor is configured to apply the receive weight to spoil the subarray beam to broaden the subarray beam and steer the subarray beam. In some embodiments, the processor is configured to generate guard beam data for each subarray by selecting a maximum value of the scaled subarray data magnitudes. In some embodiments, the processor is configured to determine the maximum value of the scaled subarray data magnitudes in accordance with:

$$BG(BeamNum) = \max_i [SF_i(BeamNum) \times |SA_i|],$$

where
$SA_i$ is the ith subarray beam data, $SF(BeamNum)$ is the ith subarray scale factor for receive beam BeamNum, and $BG(BeamNum)$ is the guard beam data for receive beam BeamNum.

In some embodiments, the processor is configured to determine the return radar data corresponds to a mainlobe if:

$|BM(BeamNum)| > BG(BeamNum)$, where $|BM(BeamNum)|$ is the magnitude of the return radar data for beam number BeamNum.

In some embodiments, the processor is configured to determine the return radar data corresponds to a grating lobe or sidelobe if:

$|BM(BeamNum)| \leq BG(BeamNum)$.

In some embodiments, the scale factors for the receive beams are determined in accordance with:

$$SF_i(BeamNum) = \frac{K|RBP(BeamNum)|_{MAX}}{|SAP_i @ Ang|},$$

where $|RBP(BeamNum)|_{MAX}$ is maximum magnitude for receive beam pattern for beam number BeamNum, $SF_i(BeamNum)$ is the scale factor for ith subarray for the receive beam BeamNum, $SAP_i$ is the ith subarray beam pattern data, and Ang is the receive angle of a subarray, K is a beamwidth factor.

In some embodiments, Ang is determined in accordance with:

$$Ang = \begin{Bmatrix} Ang_L \\ Ang_R \end{Bmatrix},$$

where $Ang_L$ is selected if boresight of $SAP_i$ is pointed left of receive beam BeamNum, and $Ang_R$ otherwise.

In some embodiments, the processor is configured to determine location of a target with the system based on the return radar data that corresponds to the mainlobe.

The array antenna systems and methods (hereinafter "technology") described herein can provide one or more of the following advantages. An advantage of the technology is that steering subarrays on a cylindrical array do not require extra hardware (e.g., physically overlapped subarrays). Another advantage is the technology can be used to eliminate sidelobe and grating lobe hits by steering the subarrays on a cylindrical array to different directions, which creates spatial separation which in turn can be used as a guard channel to eliminate sidelobe and grating lobe hits.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Embodiments disclosed herein digitally distinguish mainlobe detections from grating lobe and sidelobe detections in an array antenna (e.g., linear or cylindrical array antennas) without the need to overlap subarrays of the antenna. Scaled subarray patterns create a guard channel and are steered to different directions to create spatial separation. Once the subarrays are spatially separated, a comparison is performed to distinguish the mainlobe from grating lobes and sidelobes.

Figure 1:
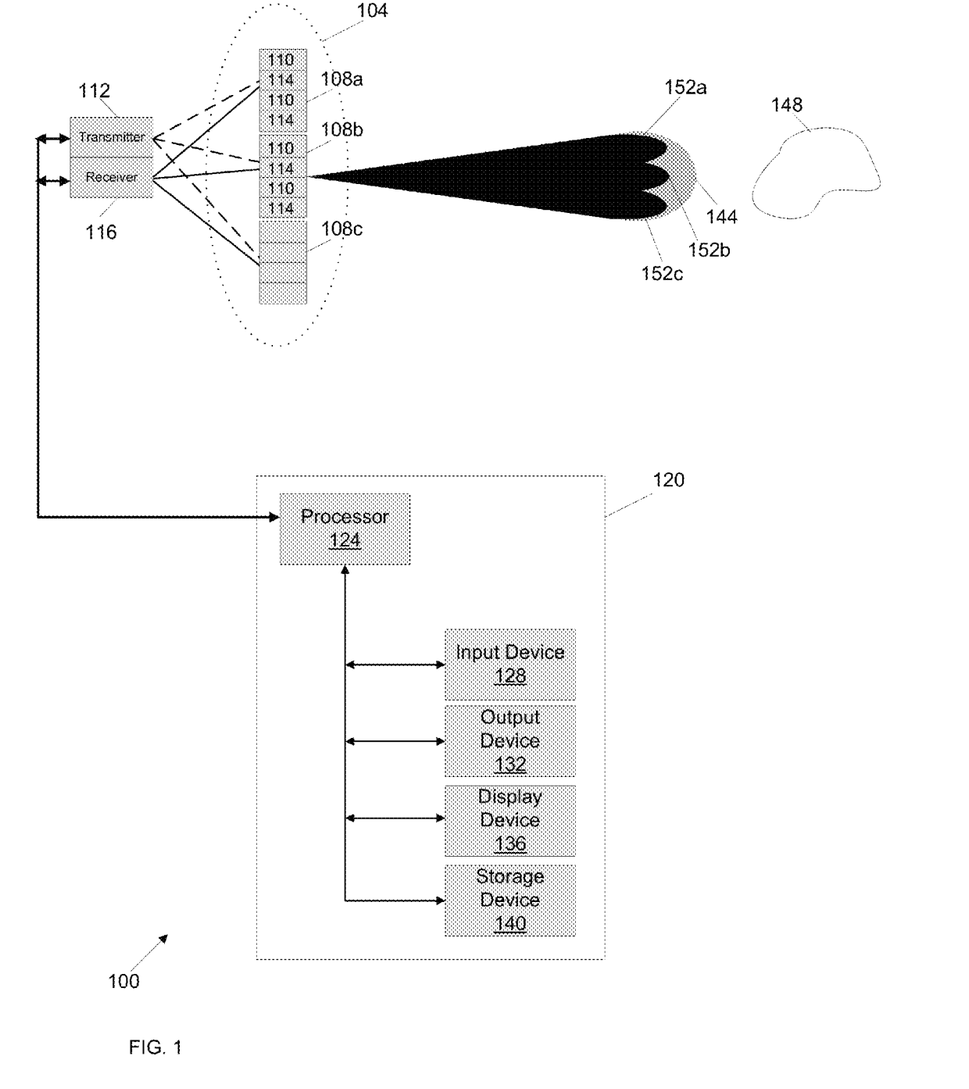
FIG. 1 is a schematic illustration of a system for digitally distinguishing mainlobe detections from grating lobe and sidelobe detections, according to an illustrative embodiment.
Figure 2:
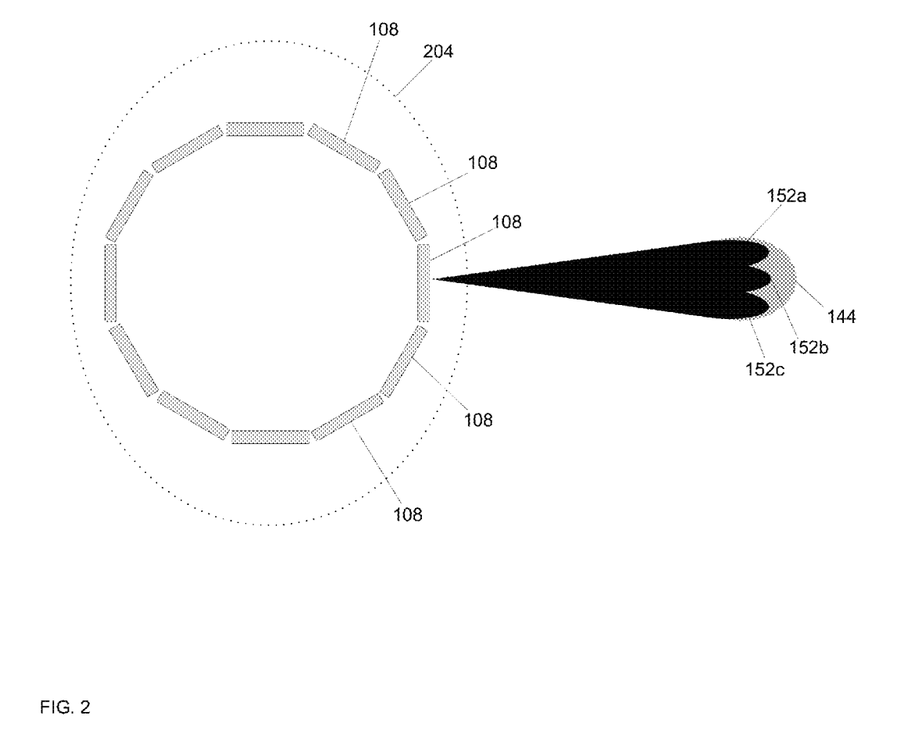
FIG. 2 is a schematic illustration of a cylindrical array antenna for use with the system of FIG. 1, according to an illustrative embodiment.

FIG. 1 is a schematic illustration of an array radar antenna system 100 for digitally distinguishing mainlobe detections from grating lobe and sidelobe detections, according to an illustrative embodiment. The system 100 includes an array antenna 104 that has a plurality of subarrays 108a, 108b and 108c (generally 108). In this embodiment, the array antenna 104 is a linear array. Other array types (e.g., the cylindrical array 204 of FIG. 2) can be used in alternative embodiments. Each of the subarrays 108 of the array antenna 104 include a plurality of transmit 110 and receive 114 elements.

The system 100 also includes a transmitter 112 and receiver 116 that are coupled to each of the subarrays 108. The system 100 also includes a beam forming module 120 that includes a processor 124, electrically coupled to the transmitter 112 and the receiver 116. The processor 124 can be, for example, a synthetic aperture imaging processor or other suitable computer processor used in radar systems for controlling operation of a radar system. The processor 124 provides transmission signals 144 to the transmitter 112 which are transmitted by the transmit elements 110 of the antenna 104. The transmission signals 144 (e.g., radar transmission signals) are directed towards a target 148 (e.g., aircraft, satellite, vehicle, boat) to, for example, determine the range and velocity of the target relative to the antenna 104. Radar return signals 152a, 152b, and 152c (generally 152) (e.g., radar response signals reflected back towards the antenna 104 in response to the transmission signals 144 impinging upon the target 148) are received by the receive elements 114 of the antenna 104. The receiver 116 receives the radar return signals 152 from the antenna 104 and directs the signals 152 to the processor 124. The processor 124 is configured to process the various signals of the system 100 to digitally distinguish mainlobe detections from grating lobe and sidelobe detections using, for example, the method of FIG. 3.

The modules and devices described herein can, for example, utilize the processor 124 to execute computer executable instructions and/or include a processor to execute computer executable instructions (e.g., an encryption processing unit, a field programmable gate array processing unit, etc.). The system 100 can include, for example, other modules, devices, and/or processors known in the art and/or varieties of the illustrated modules, devices, and/or processors.

The input device 128 receives information associated with the system 100 (e.g., instructions from a user, instructions from another computing device) from a user (not shown) and/or another computing system (not shown). The input device 128 can include, for example, a keyboard or a scanner. The output device 132 outputs information associated with the system 100 (e.g., information to a printer (not shown), information to an audio speaker (not shown)).

The display device 136 displays information associated with the system 100 (e.g., status information, configuration information). The processor 124 executes the operating system and/or any other computer executable instructions for the system 100 (e.g., sends signals to the transmitter 112 for transmission (transmission signals 144) by the antenna 104, or receives radar return signals 152 from the antenna 104).

The storage device 140 stores the various information associated with the system 100 and its operation. The storage device 140 can store information and/or any other data associated with the system 100. The storage device 140 can include a plurality of storage devices. The storage device 140 can include, for example, long-term storage (e.g., a hard drive, a tape storage device, flash memory, etc.), short-term storage (e.g., a random access memory, a graphics memory, etc.), and/or any other type of computer readable storage.

Figure 3:
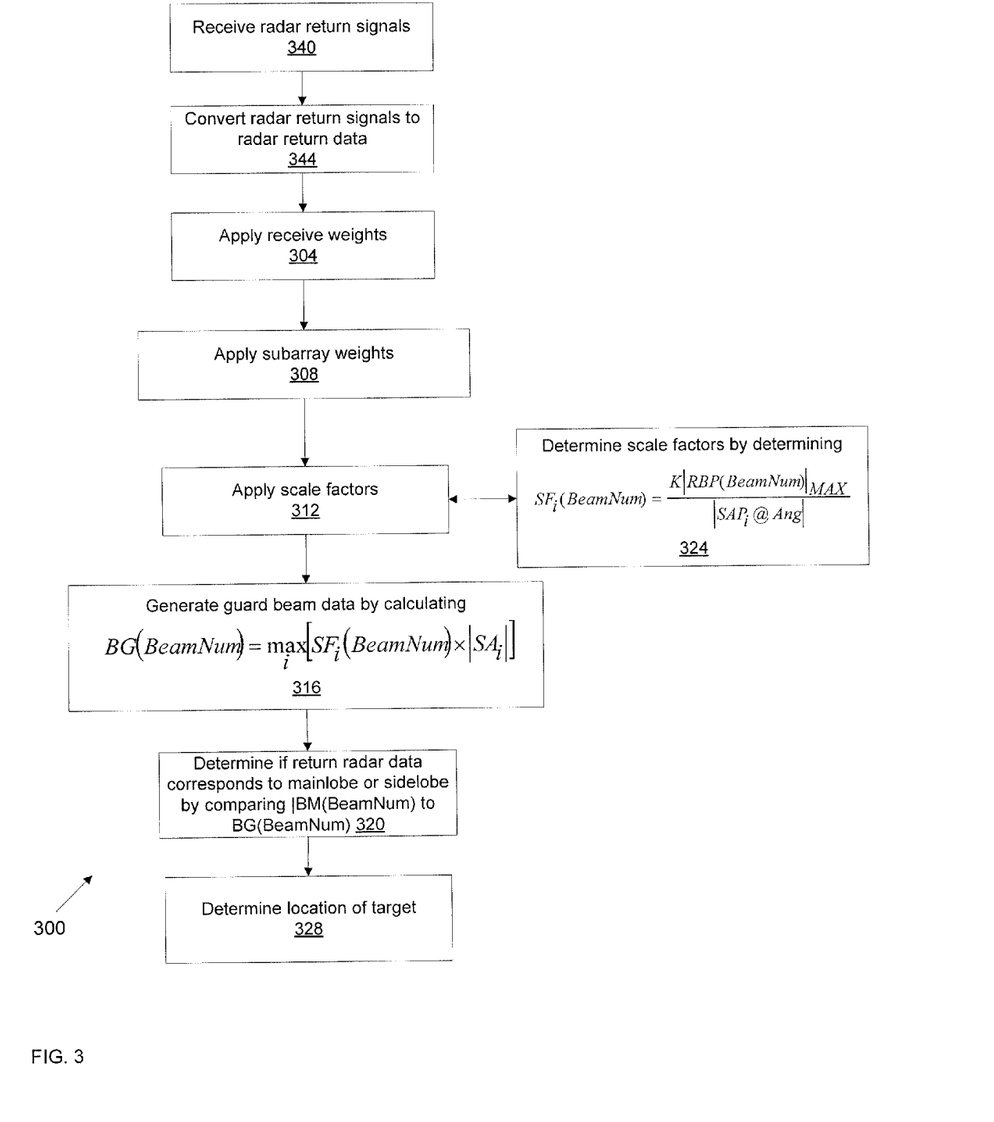
FIG. 3 is a flowchart of a method for digitally distinguishing mainlobe detections from grating lobe and sidelobe detections, according to an illustrative embodiment.

FIG. 3 is a flowchart 300 of a method for digitally distinguishing mainlobe detections from grating lobe and sidelobe detections in an array antenna system (e.g., array antenna 100 of FIG. 1), according to an illustrative embodiment. The method includes receiving 340 radar return signals from a radar antenna receiver (e.g., receiver 116 of FIG. 1). The method also includes converting 344 the radar return signals (e.g., signals 152 of FIG. 1) to radar return data. The method then involves applying receive weights 304 to the radar return data for each radar receive element (e.g., radar receive elements 114 of FIG. 1) to steer each subarray (e.g., subarrays 108 of FIG. 1) to a direction other than the subarray transmit angle (i.e., direction other than the direction of the transmission signal 144 of FIG. 1). The method also includes applying a subarray weight 308 to each subarray to generate array radar antenna receive beam data, where the receive beam data has magnitude and phase components.

The method also includes applying predetermined scale factors 312 to the subarray beam data magnitude for each subarray to generate scaled subarray beam data magnitudes. In one embodiment, the scale factors are determined in accordance with $$SF_i(BeamNum) = \frac{K|RBP(BeamNum)|_{MAX}}{|SAP_i @ Ang|} \quad \text{EQN. 1}$$

where $|RBP(BeamNum)|_{MAX}$ is the maximum magnitude for the receive beam pattern for beam number BeamNum, $SF_i$(BeamNum) is the scale factor for ith subarray for the receive beam BeamNum, $SAP_i$ is the ith subarray beam pattern data, Ang is the receive angle of a subarray, and K is a beamwidth factor.

The method also includes generating guard beam data 316 for each subarray based on the scaled subarray beam data magnitudes. The guard beam data is generated by taking the maximum value of the scaled subarray data magnitudes in accordance with:

$$BG(BeamNum) = \max_i [SF_i(BeamNum) \times |SA_i|] \quad \text{EQN. 2}$$

where $SA_i$ is the ith subarray beam data, SF(BeamNum) is the ith subarray scale factor for receive beam BeamNum, and BG(BeamNum) is the guard beam data for receive beam BeamNum.

The method also includes determining 320 if the return radar data corresponds to a mainlobe or a grating lobe or sidelobe based on the receive beam data and the guard beam data. In one embodiment, the return radar data corresponds to a mainlobe if:

$$|BM(BeamNum)| > BG(BeamNum) \quad \text{EQN. 3}$$

where |BM(BeamNum)| is the magnitude of the return radar data for beam number BeamNum. The return radar data corresponds to a grating lobe or sidelobe if:

$$|BM(BeamNum)| \leq BG(BeamNum).$$

Figure 4A:
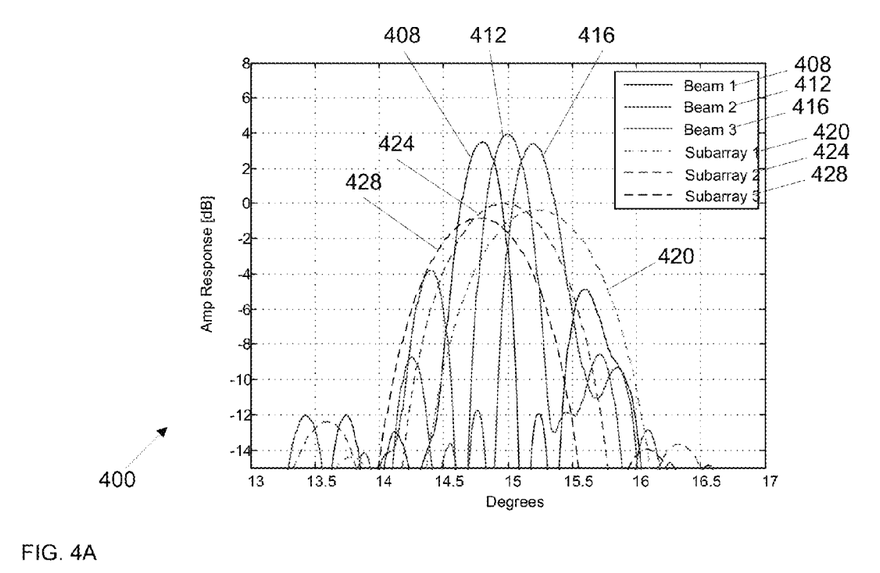
FIG. 4A is a plot of the exemplary amplitude response for three receive beams in the azimuth direction for a cylindrical array without using embodiments of the methods described herein.
Figure 4B:
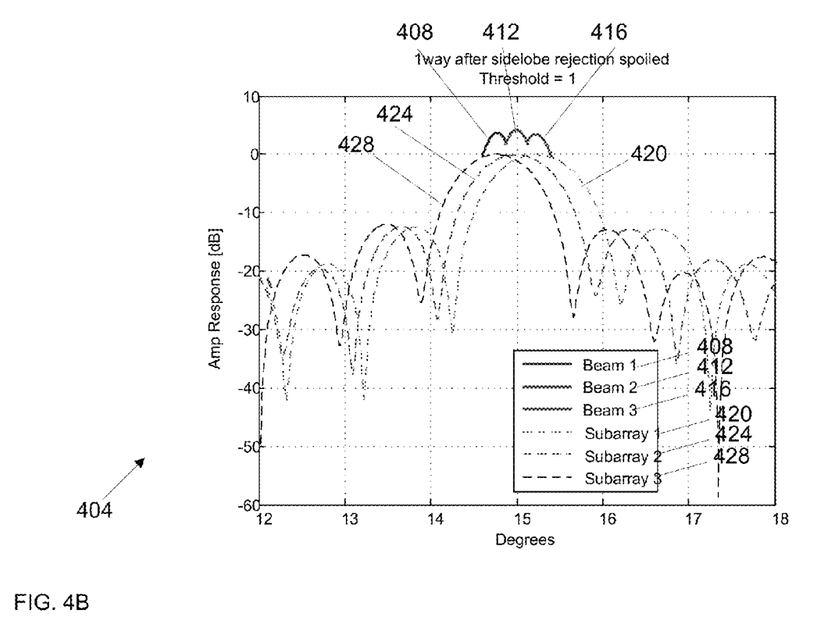
FIG. 4B is a plot of the exemplary amplitude response for three receive beams in the azimuth direction for a cylindrical array with use of embodiments of the methods described herein.

FIG. 4A is a plot 400 of the exemplary amplitude response for three receive beams in the azimuth direction for a cylindrical array antenna system without using embodiments of the methods described herein. The antenna system has a 3 subarray configuration (3 horizontally and 1 vertically) in which the subarrays are not overlapped. Plots 408, 412, and 416 are the amplitude response for the 3 receive beams (results of step 308 of FIG. 3). Plots 420, 424, and 428 are the amplitude response for the 3 scaled subarray beam data magnitudes (results of step 312 of FIG. 3). The transmit beam of the antenna system is steered to 15° azimuth and 0° elevation. The transmit beam is spoiled 3:1 and the receive beams are unspoiled. Three simultaneous receive beams are formed in the azimuth direction. FIG. 4B is a plot 404 of the exemplary amplitude response for three receive beams in the azimuth direction for a cylindrical array with use of embodiments of the methods described herein. The Y-axis for both plots 400, 404 is the amplitude response in dB. The X-axis for both plots 400, 404 is the azimuth angle of the beams.

Figure 5:
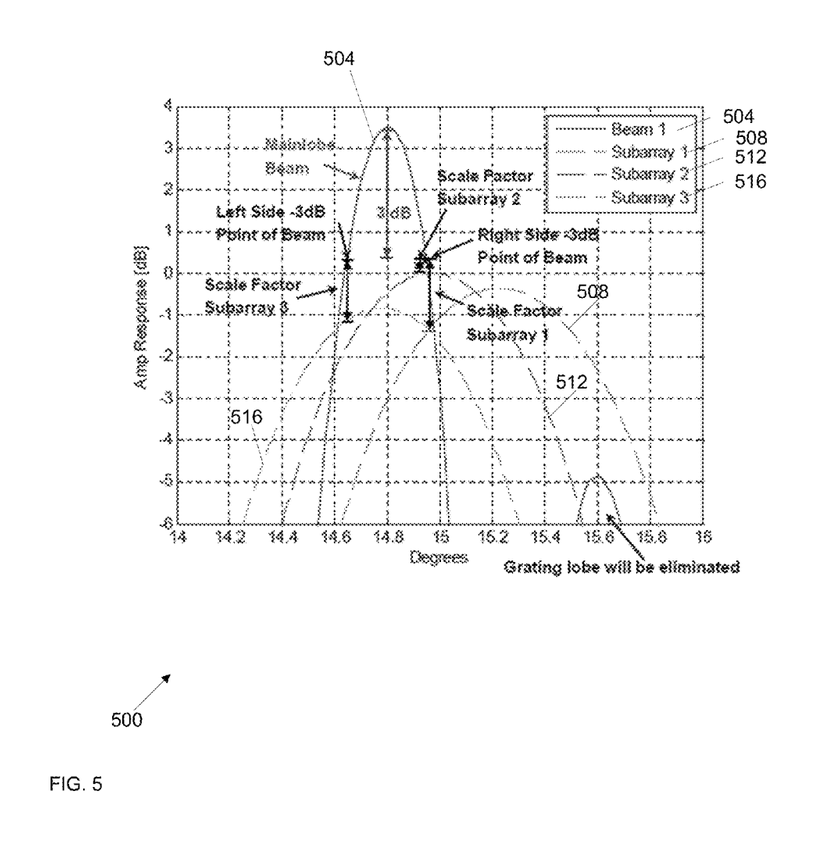
FIG. 5 is a plot of the exemplary amplitude response a receive beam in the azimuth direction for a cylindrical array antenna system.

FIG. 5 is a plot 500 of the exemplary amplitude response a receive beam in the azimuth direction for a cylindrical array antenna system. The Y-axis for plot 500 is the amplitude response in dB. The X-axis for plot 500 is the azimuth angle of the beams. The antenna system has a 3 subarray configuration (3 horizontally and 1 vertically) in which the subarrays are not overlapped. Plot 504 is the amplitude response for the amplitude response for the receive beam (e.g., result of step 308 of FIG. 3). Plots 508, 512, and 516 are the amplitude response for the 3 scaled subarray beam magnitudes (e.g., results of step 312 of FIG. 3) illustrating the corresponding scale factors 520, 524, and 528 determined in accordance with the method steps of FIG. 3.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for digitally distinguishing mainlobe detections from grating lobe and sidelobe detections, the method comprising:

applying receive weights to return radar data, initially transmitted by radar transmit elements of a plurality of subarrays of an array radar antenna, each at a subarray transmit angle, for each radar receive element of each subarray to steer each subarray to a direction other than the subarray transmit angle;

applying a subarray weight to each steered subarray to generate receive beam data of the array radar antenna having magnitude and phase components;

determining the scale factors for the receive beams in accordance with:

$$SF_i(BeamNum) = \frac{K|RBP(BeamNum)|_{MAX}}{|SAP_i @ Ang|},$$

where $|RBP(BeamNum)|_{MAX}$ is maximum magnitude for a receive beam for beam number BeamNum, $SF_i$(BeamNum) is a scale factor of the applied scale factors for ith subarray for the receive beam BeamNum, $SAP_i$ is an ith subarray beam pattern data, and Ang is a receive angle of a subarray, K is a beamwidth factor, wherein Ang is determined in accordance with:

$$Ang = \left\{ \begin{array}{l} Ang_L \\ Ang_R \end{array} \right\},$$

where $Ang_L$ is selected if boresight of $SAP_i$ is pointed left of receive beam BeamNum, and $Ang_R$ otherwise;

applying the determined scale factors to a subarray beam data magnitude for each steered subarray to generate scaled subarray beam data magnitudes;

generating guard beam data for each steered subarray based on the scaled subarray beam data magnitudes by selecting a maximum value of the scaled subarray beam data magnitudes in accordance with in accordance with:

$$BG(BeamNum) = \max_i [SF_i(BeamNum) \times |SA_i|],$$

where $SA_i$ is the ith subarray beam data, $SF_i$(BeamNum) is the ith subarray scale factor for a receive beam BeamNum, and BG(BeamNum) is the guard beam data for receive beam BeamNum; and determining if the return radar data corresponds to a mainlobe or sidelobe based on the receive beam data and the guard beam data for each subarray, wherein the return radar data corresponds to a mainlobe if:

|BM(BeamNum)|>BG(BeamNum), where |BM(BeamNum)| is the magnitude of the return radar data for beam number BeamNum and wherein the return radar data corresponds to a grating lobe or sidelobe if: |BM(BeamNum)|≤BG(BeamNum).

2. The method of claim 1, wherein the array radar antenna is a linear array or a cylindrical array.

3. The method of claim 1, wherein the array radar antenna is a cylindrical array and applying the receive weight spoils the subarray beam to broaden the subarray beam and steer the subarray beam.

4. The method of claim 1, comprising determining location of a target with an array radar antenna system based on the return radar data that corresponds to the mainlobe.

5. A system for digitally distinguishing mainlobe detections from grating lobe and sidelobe detections, the system comprising:

a plurality of subarrays in an array radar antenna system, each subarray including a plurality of receive elements;

a beam forming module including a processor configured to:

apply receive weights to radar return data, initially transmitted by radar transmit elements of a plurality of subarrays of an array radar antenna, each at a subarray transmit angle, for each radar receive element of each subarray to steer each subarray to a direction other than the subarray transmit angle;

apply a subarray weight to each steered subarray to generate the array radar antenna receive beam data of the array radar antenna having magnitude and phase components;

determine scale factors for the receive beams in accordance with:

$$SF_i(BeamNum) = \frac{K|RBP(BeamNum)|_{MAX}}{|SAP_i @ Ang|},$$

where $|RBP(BeamNum)|_{MAX}$ is maximum magnitude for receive beam for beam number BeamNum, $SF_i$ (BeamNum) is a scale factor of the applied scale factors for ith subarray for the receive beam BeamNum, $SAP_i$ is the ith subarray beam pattern data, and Ang is the receive angle of a subarray, K is a beamwidth factor, wherein Ang is determined in accordance with:

$$Ang = \begin{Bmatrix} Ang_L \\ Ang_R \end{Bmatrix},$$

where $Ang_L$ is selected if boresight of $SAP_i$ is pointed left of receive beam BeamNum, and $Ang_R$ otherwise, apply predetermined scale factors to a subarray beam data magnitude for each steered subarray to generate scaled subarray beam data magnitudes;

generate guard beam data for each steered subarray based on the scaled subarray beam data magnitudes by selecting a maximum value of the scaled subarray data magnitudes in accordance with:

$$BG(BeamNum) = \max_i [SF_i(BeamNum) \times |SA_i|],$$

where $SA_i$ is the ith subarray beam data, SF(BeamNum) is the ith subarray scale factor for receive beam BeamNum, and BG(BeamNum) is the guard beam data for receive beam BeamNum; and determine if the return radar data corresponds to a mainlobe or a grating lobe or sidelobe based on the receive beam data and the guard beam data, wherein the return radar data corresponds to a mainlobe if:

|BM(BeamNum)|>BG(BeamNum), where

|BM(BeamNum)| is the magnitude of the return radar data for beam number BeamNum and wherein the return radar data corresponds to a grating lobe or sidelobe if:

|BM(BeamNum)|≤BG(BeamNum).

6. The system of claim 5, wherein the array radar antenna is a linear array or a cylindrical array.

7. The system of claim 5, wherein the array radar antenna is a cylindrical array and the processor is configured to apply the receive weight to spoil the subarray beam to broaden the subarray beam and steer the subarray beam.

8. The system of claim 5, wherein the processor is configured to determine location of a target with the system based on the return radar data that corresponds to the mainlobe.

* * * * *